United States Patent [19]

Ban

[11] Patent Number: 4,732,026
[45] Date of Patent: Mar. 22, 1988

[54] METHOD OF LAP WELDING EVENTUAL CAN BLANK CONSISTING OF METAL SHEET OR THE LIKE

[75] Inventor: Kunikatsu Ban, Mie, Japan

[73] Assignee: N.P.W. Technical Laboratory, Co., Japan

[21] Appl. No.: 838,502

[22] Filed: Mar. 11, 1986

[30] Foreign Application Priority Data

Mar. 11, 1985 [JP] Japan ................................. 60-48699

[51] Int. Cl.$^4$ ..................... B21D 39/02; B21D 51/28; B23K 11/06
[52] U.S. Cl. ......................................... 72/52; 219/83; 219/64; 219/84; 228/150
[58] Field of Search ................. 72/52, 51, 48; 219/64, 219/83, 84; 228/150, 153, 265; 229/8.5, 10.53, 59.1

[56] References Cited

U.S. PATENT DOCUMENTS

| | | | |
|---|---|---|---|
| 3,596,043 | 7/1971 | Sporri | 219/83 |
| 3,834,010 | 9/1974 | Wolfe et al. | 228/150 |
| 4,160,892 | 7/1979 | Opprecht et al. | 219/83 |
| 4,258,245 | 3/1981 | Flaherty | 219/83 |
| 4,404,447 | 9/1983 | Kitamura et al. | 219/83 |

FOREIGN PATENT DOCUMENTS 2150016 4/1973 Fed. Rep. of Germany ...... 228/265

Primary Examiner—Robert L. Spruill
Assistant Examiner—Donald R. Studebaker
Attorney, Agent, or Firm—Sughrue, Mion, Zinn, Macpeak, and Seas

[57] ABSTRACT

A method of lap welding an eventual can blank of a metal sheet or the like by passing a lap joint between the upper and lower roller electrodes via upper and lower wire electrodes to be heated and simultaneously applied pressure, thereby forming continuous thermal press bond sections, wherein the width of the contact surface of the upper and lower wire electrodes is set to three times the width of the lap joint, and the thermal press bond sections are formed by thermal press bonding without fusion, the center-to-center distance between adjacent thermal press bond sections being set to be in a range of 0.8±0.2 mm.

4 Claims, 7 Drawing Figures

Distance from the center line of weld zone (mm)

METHOD OF LAP WELDING EVENTUAL CAN BLANK CONSISTING OF METAL SHEET OR THE LIKE

BACKGROUND OF THE INVENTION

1. Field of the Invention

This invention relates to a method of lap welding an eventual can blank consisting of a metal sheet or the like and, more particularly, a method noted above, in which a lap joint of an eventual can blank consisting of a metal sheet or a covered metal sheet such as a plated metal sheet in a cylindrical form is bonded by heating it and also simultaneously pressing it by passing it between upper and lower roller electrodes via upper and lower wire electrodes.

2. Description of the Prior Art

Heretofore, seam welding has been well known as a resistance welding process, and it is also referred to as joint welding. By this welding process, since a weld zone having an excellent seal property can be obtained, it is used for making liquid transport pipes, fuel tanks, drum cans, food cans, etc., and various seam welding processes have been proposed depending on the kind of weld joint and characters of materials such as steel plates or sheets to be welded. However, there is no welding process proposed, which can be used for manufacturing food cans and drink cans only.

Lap seam welding is the most general process among various seam welding processes, in which the lap joint consists of overlapped parts of a steel sheet and is welded by energizing it under pressure in a state pinched between upper and lower disk-like or roller electrodes. This welding process can be regarded as continuous repetition, caused by the roller electrodes, of spot welding which is the most popular resistance welding process. The lap joint is energized intermittently and regularly during welding process, and the weld zone thereof is thermally fused by the Joule heat, so that circular nuggets are formed continuously. Thus, in the lap seam joint, the overlapped upper and lower steel plates are seamed and jointed together by the continuous nuggets. A weld zone having excellent air-tightness and gas-tightness thus can be obtained. The process is therefore also referred to as seam welding from this bonded state.

In the lap seam welding, however, the width of the contact surfaces of the upper and lower roller electrodes is smaller than the width of the lap joint, i.e., overlapped parts. Therefore, bondless portions will remain on the opposite side of the weld line in the weld zone. When the weld zone is subsequently coated with a synthetic resin, the opposite edges are coated with difficulty. Corrosion, therefore, proceeds from these bondless portions, and there is a possibility of cutting a hand when handling the welded product. Accordingly, mash seam welding, which is a variety of the lap seam welding, has been proposed as a welding process, with which bondless portions will not remain on the opposite sides of the weld line.

In the mash seam welding process, while the lap joint is fused under a pressure it is mashed between upper and lower roller electrodes having contact surfaces of a width greater than the width of the lap joint, whereby a seam weld is obtained. Unlike the ordinary lap seam welding process, the welding surfaces in the weld zone are mashed obliquely to be fused and press bonded. In this case, no bondless portions will remain on the opposite sides of the weld line. In the weld zone, therefore, nuggets are formed continuously due to fusion, and the welding surfaces are press bonded together. Hence, the weld has high mechanical strength and are excellent seal property.

Meanwhile, drink cans and food cans are rarely manufactured from cold rolled steel sheet. Instead, covered steel sheets, i.e., tin-plated steel sheet, are mostly used to meet anti-corrosion demand. When the covered steel sheet is seam welded using the roller electrodes noted above, the covering metal, e.g., tin, migrates to and contaminates the periphery, i.e., contact surface, of the roller electrodes. Accordingly, wire electrodes such as copper wires are provided on the outer periphery of the roller electrodes so that the covered steel sheet is in contact with the wire electrodes to effect the seam welding. One such method is disclosed in Japanese Patent Publication No. 25213/69.

In this welding process, circumferential grooves are formed in the outer periphery of the upper and lower roller electrodes, and wire electrodes are received in the grooves to be fed with the rotation of the roller electrodes, whereby the lap joint is fused while it is pressed between the upper and lower wire electrodes to form nuggets and effect welding. Again in this process employing the wire electrodes, like the case of the solitary roller electrodes noted above, the problem of bondless portions remaining on the opposite sides of the weld line will arise if the width of the contact surfaces of the wire electrodes is smaller than the width of the lap joint. Accordingly, it has been proposed to preliminarily flatten the wire electrode into an oval sectional shape to make the width of the contact surface greater than the width of the lap joint for mash seam welding to produce drink cans and food cans. Such a mash seam welding process is discussed in Japanese Patent Publication No. 26213/79.

In this disclosed mash seam welding process, in addition to making the width of the contact surface of wire electrode greater than the width of the lap joint, the width of the lap joint is set to 3 to 6 times the thickness of the steel sheet blank. Although in this process the width of the lap joint is restricted in relation to the thickness of the sheet blank, actually there is no definite technical basis of the relation between the thickness of the sheet blank and the width of the lap joint. The relation is set from mere consideration of the fact that thin steel sheets as thick as about 0.15 to 0.25 mm are used for drink cans and food cans. More specifically, even if the lap joint is formed from overlapped edges of a steel sheet blank in a cylindrical form using a guide bar of Z-shaped sectional profile as disclosed in Japanese Patent Publication No. 31449/69, the actualized limit of the width thereof is approximately 0.8 mm. Essentially, the mash seam welding is carried out using wire electrodes having a couple of time the width of the lap joint. In a further aspect, tin-plated steel sheet that are actually used for the manufacture of drink cans and food cans, have a resin coating preliminarily printed on their surface, which will be changed during the fixing of the resin coating. The fact, however, is not taken into consideration. Furthermore, the welded eventual can blank is subjected for flange formation and rounding processes for attaching the bottom and lid to complete a can, but a weld zone which has a mechanical strength sufficient to withstand these processes can not be obtained by welding process noted above. The foregoing is summarized as follows.

(1) The blank for the drink cans and food cans is cut into a required size from a steel sheet. On the surface of the blank is printed, except for edge portions for forming the lap joint, predetermined characters and drawings in the form of a resin coating. After the coating film is fixed, the blank is shaped into a cylindrical form and then the lap joint is welded. However, the surface character of the edge portions free from coating is changed by the heat generated during the fixing of the coat. For example, tin of a plating layer is considerably alloyed with iron. This leads to considerable fluctuations of the contact resistance at the time of the welding. When welding is performed under this condition, such welding defects as scatering, gapping and reaking are liable to be produced in the weld zone due to the character change noted above.

(2) Where the width of the lap joint is 3 to 6 times the thickness of the blank and the blank is as thin as 0.2 mm, for instance, the width of the lap joint is as large as 0.8 mm. In this case, therefore, it is necessary to cause as much current as possible at the time of the welding and hence the proper current range is narrow, with which an erroneous current control would result in increased fusion. In such a case, a weld zone capable of withstanding the end flange formation process after welding cannot be obtained. In addition, with an increase of the width of the lap joint the diameter of the wire electrode has to be increased, which is a great economical disadvantage because an expensive copper wire is consumed as a wire electrode in a single welding operation. The increase of the width of the lap joint also increases the width of the overlapped edge portions of the blank material, e.g., steel sheet, which is undesired from the standpoint of economy.

(3) Since the width of the contact surface of the wire electrode is smaller compared to the width of the lap joint, typically a couple of times the width of the lap joint, it is necessary to strictly regulate the position of the lap joint with respect to the upper and lower wire electrodes. This regulation is very difficult and is liable to be lost due to such cause as vibrations of the welder. Once the regulation is lost, the welding property is extremely deteriorated to extremely reduce the yield.

(4) When forming nuggets to produce a lap joint in mash seam welding, the weld zone has to be partly fused and solidified. The nugget has a different structure from the ordinary casting structure. Due to the partial fusion of the weld zone, the hardness of the nuggents is increased compared to the rest of the weld zone and the structure thereof is also changed. Therefore, the weld zone is readily cracked during double binding or flange formation processes after the welding process due to the difference in the hardness and structure.

SUMMARY OF THE INVENTION

An object of the invention is to overcome the drawbacks discussed above. According to the invention, there is provided a method of lap welding edge portions of a metal sheet or covered metal sheet as blank by simultaneously heating and applying pressure to the lap joint by passing the lap joint between upper and lower roller electrodes via upper and lower wire electrodes to thereby form continuous thermal press bond sections, the width of the contact surface of the upper and lower wire electrodes is set to three times the width of the lap joint or above, in which method the width of the lap joint is set to three times the thickness of the blank or above, the thermal press bond sections are formed by thermal press bonding without causing fusion, and the center-to-center distance between adjacent thermal press bond sections is set to be in a range of 0.8±0.2 mm.

The inventors considered the peculiarity of the manufacture of drink cans and foods cans that an eventual can, being formed by welding the lap joint, i.e., overlapped edges, of a metal sheet or plated metal sheet blank in a cylindrical form, is subsequently subjected to end rounding and flange formation processes, and they investigated the weld strength suited to these processes. They found that when continuous nuggets were formed with fusion of part of the weld zone in welding the lap joint by passing it between upper and lower wire electrodes having contact surfaces of a width greater than its width, the hardness and other characteristics and structure of the nuggets are changed from those of the blank material, so that the weld zone is readily ruptured. They also found that if the fusion is caused excessively at the time of the formation of the nuggets, such weld defect as scattering and blow holes would result.

The inventors accordingly made a study on a condition, with which it is possible to eliminate the rupture of the weld zone at the time of the end rounding and flange formation processes after the welding. As a result, they found that it is necessary to hold the hardness and structure of the weld zone the same as those of the blank material without carrying out any thermal process.

For this reason, according to the invention no nuggets are formed at the time of the welding, but the entire area of the lap joint is uniformly heated without causing fusion, thus reducing deformation resistance of the surfaces to be jointed, while applying a predetermined pressure from the upper and lower wire electrodes. In this way, the two surfaces are given a great plastic change and bonded together. This thermal press bond is formed continuously just like the bond with the formation of nuggets as in the prior art welding. By way of example, a weld zone obtained by mash seam welding of a lap joint a tin-plate sheet 0.5 mm in thickness (with a Vickers hardness of 190 to 200) through formation of continuous nuggets had a Vickers hardness in excess of 300, and it also has a local casting structure similar to that obtained by the DC arc welding. In contrast, where a thermal press bond free from fusion is formed continuously to effect welding as according to the invention, the weld zone had a Vickers hardness in a range of 170 to 210. In addition, no casting structure was recognized, and the welding surfaces were perfectly integrated.

As a result of specific investigations conducted on the condition for realizing the above welding in case where the blank is a steel sheet or covered steel sheet with a thickness of 0.5 mm or below, it has been found that:

(a) The center-to-center distance between adjacent ones of continuously formed thermal press bond sections should be in a range of 0.8±0.2 mm;

(b) The width of the lap joint should be as small as no greater than, the preferably less than, three times the thickness of the blank;

(c) The width of the contact surfaces of the upper and lower wire electrodes should be as large as no less than, preferably more than, three times the width of the lap joint; and (d) The pressure applied between the upper and lower roller electrodes should be increased and, when the width of the lap joint is in the range shown in (b), it should be adjusted to an adequate value in relation to the thickness of the blank.

When the above requirements for the welding are satisfied, a weld zone with continuous thermal press bond sections as noted above can be obtained. In addition, the width of the contact surfaces of the upper and lower wire electrodes can be made as large as three times the width of the lap joint or above so that slight deviation of the lap joint with respect to the upper and lower wire electrodes due to such cause as vibrations of the welding machine gives rise to no problem. Further, the positioning of the lap joint with respect the upper and lower wire electrodes can be readily done. The contact area of the upper and lower wire electrodes and upper and lower roller electrodes is increased to reduce the contact resistance, thus eliminating heat generation from the contact surfaces to permit satisfactory welding and extend life of the roller electrodes.

Further, the width of the lap joint can be extremely reduced to reduce the heated area also permit a large current to flow at the time of the welding. Thus, the entire welding area can be uniformly heated, so that it is possible to obtain a satisfactory weld zone where inclined welding surfaces are uniformly joined together. Further more, the reduction of the width of the lap joint leads to saving of the blank material and also reduction of the size of the upper and lower wire electrodes, which is greatly desired for economy.

Moreover, a satisfactory welding can be obtained even when the blank is a cold rolled steel sheet with black skin, a tin-plated steel sheet, a chromate-treated steel sheet or a tin-plated steel sheet, on which a resin coating film is formed and fixed so that its edge portions free from coating has a different surface character from the rest.

BRIEF DESCRIPTION OF THE DRAWINGS

This invention will now be described in detail in conjunction with an embodiment illustrated in the accompanying drawings, in which:

FIG. 4b is a sectional view taken along line A—A in FIG. 4a;

DESCRIPTION OF THE PREFERRED EMBODIMENT

Figure 1:
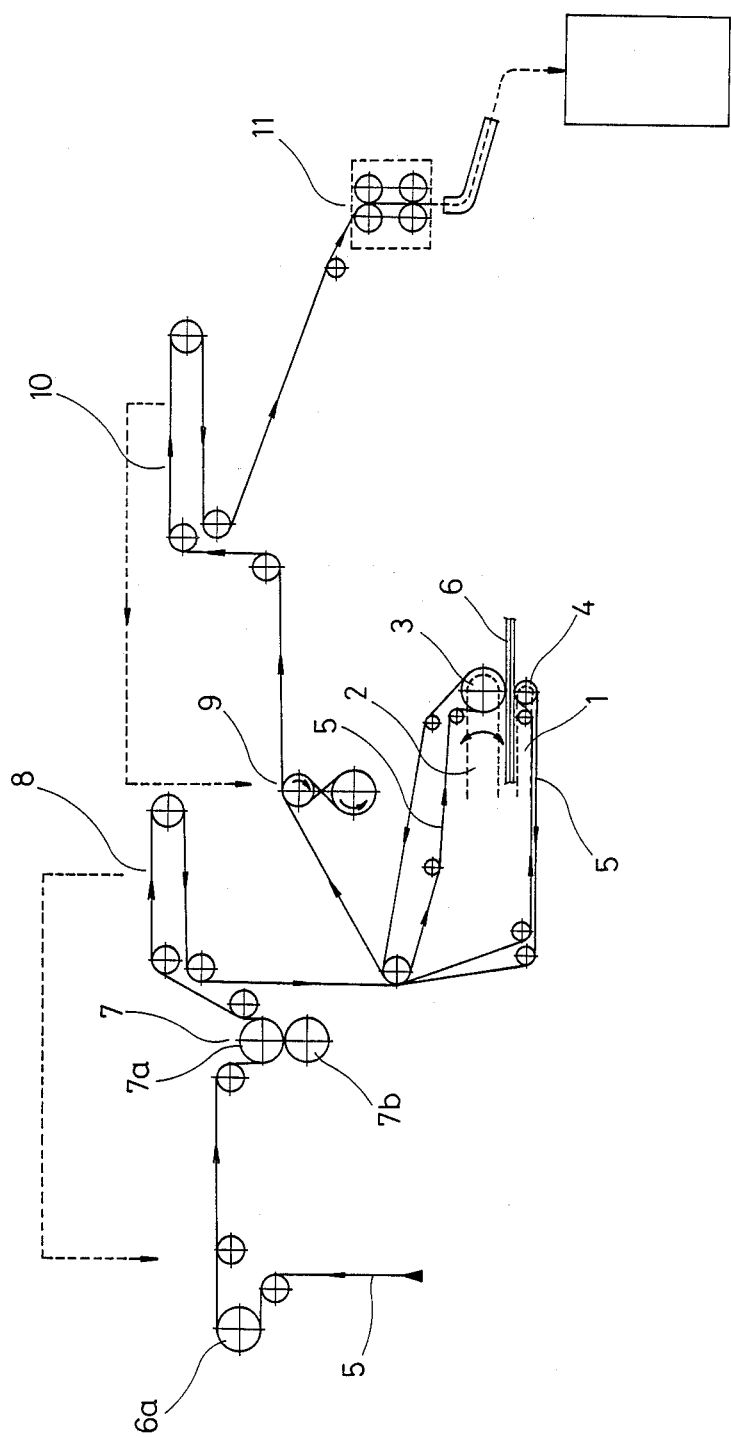
FIG. 1 is a schematic view showing a wire electrode supply system for a welding apparatus for welding a lap joint of a steel sheet blank in a cylindrical form according to the invention.
Figure 2:
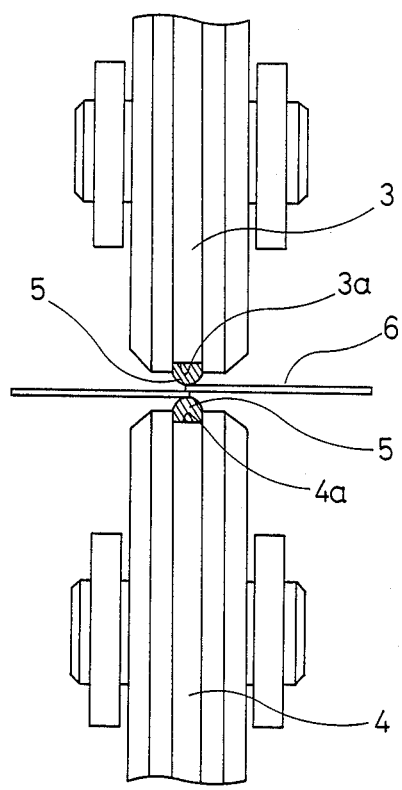
FIG. 2 is a front view showing the relation among upper and lower roller electrodes and wire electrodes and a work in the seam welding apparatus shown in FIG. 1.

Referring to FIG. 1, reference numeral 1 designates a lower welding arm, and 2 an upper welding arm. The lower welding arm 1 is usually stationary, while the upper welding arm 2 can be turned in the directions of arrows. Upper and lower roller electrodes 3 and 4 are rotatably mounted on the ends of the respective welding arms 2 and 1. As shown in FIG. 2, the upper and lower roller electrodes 3 and 4 have respective peripheral grooves 3a and 4a. In each of the grooves 3a and 4a a wire electrode 5 is held, which is substantially flat or has a rectangular or oval sectional profile. The width of the contact surface of the wire electrode 5 is set to be more than three times the width of the lap joint of an eventual can blank 6. The wire electrode 5 initially has a circular sectional shape, so that it is flattened by a pair of flattening rollers 7a and 7b into the sectional shape noted above before it is fed to the upper and lower roller electrodes 3 and 4. As the eventual can blank 6 is fed into between the upper and lower wire electrodes 3 and 4, its lap joint is pressed by these roller electrodes via upper and lower wire electrodes 5. At this time, the lap joint 12 of the eventual can blank 6 is periodically heated from the upper and lower roller electrodes 3 and 4 with application therebetween of a voltage of a sine wave, a trapezoid wave and a square wave, etc., with the polarity thereof being altered with a predetermined cycle period. ( see FIG. 3)

Figure 3:
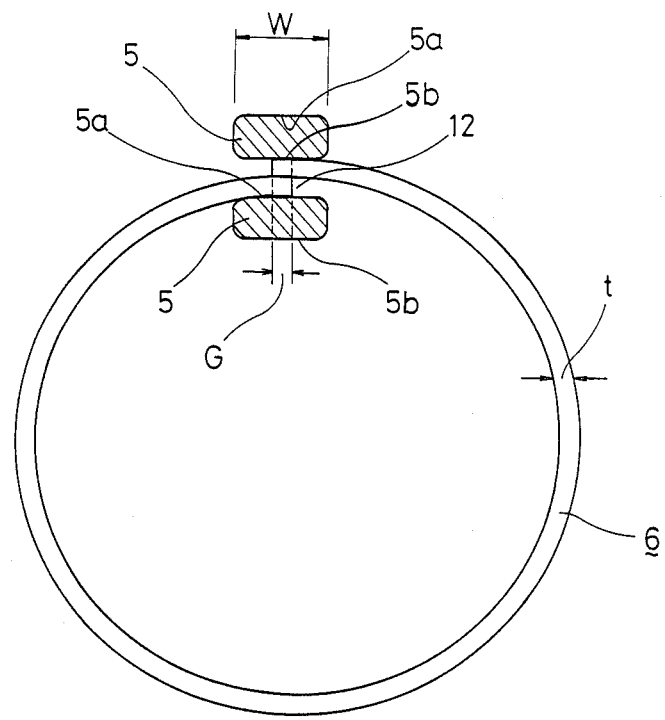
FIG. 3 is a view showing the relation among the thickness of work blank, width of the lap joint and width of the wire electrode.

The upper and lower wire electrodes 5 may be fed separately to the respective upper and lower roller electrodes 3 and 4. However, since the wire is an expensive copper wire, it is desirable from the standpoint of economy to utilize both the upper and lower surfaces 5a and 5b of a single wire electrode 5 as respective contact surfaces, as shown in FIG. 3. More specifically, as shown in FIG. 1, a single wire electrode 5 is fed continuously as shown by arrows so that its lower surface 5b is first utilized as contact surface in the upper roller electrode 3 and its upper surface 5a is subsequently utilized as contact surface in the lower roller electrode 4.

The flattening device for flattening the wire electrode 5 to provide a contact surface wider than three times the width of the lap joint 12, may be of any suitable construction. Usually, it has a pair of flattening rollers 7a and 7b, and as the wire electrode 5 is continuously fed to the flattening device 7, it is flattened into an elliptical or other flat sectional shape. As the wire electrode is flattened, it is elongated. The elongation has to be absorbed so that the wire electrode is flattened in a taut state at all time. In this way, a wire electrode 5 having a fixed sectional shape can be constantly provided. To this end, it is necessary to provide a brake device 6a before the flattening device 7. Via the brake device 6a, the wire electrode 5 can be fed into the flattening device 7 in the taut state at all times. While the elongation of the wire electrode 5 being flattened is absorbed by the brake device 6a, the actual elongation is measured using an elongation detector 8, e.g., a tension cylinder, and the absorption of the elongation is controlled through control of rate of rotatio of the flattening rollers 7a and 7b according to the measured elongation.

The flattened wire electrode 5, obtained in the manner as described, is first fed to the upper roller electrode 3 and then to the lower roller electrode 4, so that it is pressurized and energized between the upper and lower roller electrodes 3 and 4, whereby the lap joint 12 of the eventual can blank 6 are joined together. At this time, the wire electrode 5 is elongated by the heat of welding. To absorb this elongation, a wind-up pulley 9 is provided. gain at this time the elongation is measured using an elongation detector 10 such as a tension cylinder, and the rate of rotation of the wind-up pulley 9 is controlled according to the measured value.

The wire electrode 5 having been used, is cut by a cutter 11 into scrap, from which new wire electrode is produced.

The eventual can blank 6 that is fed into between the upper and lower wire electrodes 5 (see FIG. 2), is prepared in advance into a cylindrical form from a cut blank by overlapping both edges thereof such that a lap joint 12 having a predetermined width will be formed. The preparation of the eventual can blank 6 may be done automatically, semi-automtically or manually. Also, the blank 6 thus prepared may be fed into between the upper and lower roller electrodes 3 and 4 automatically, semi-automatically or manually.

Figure 4A:
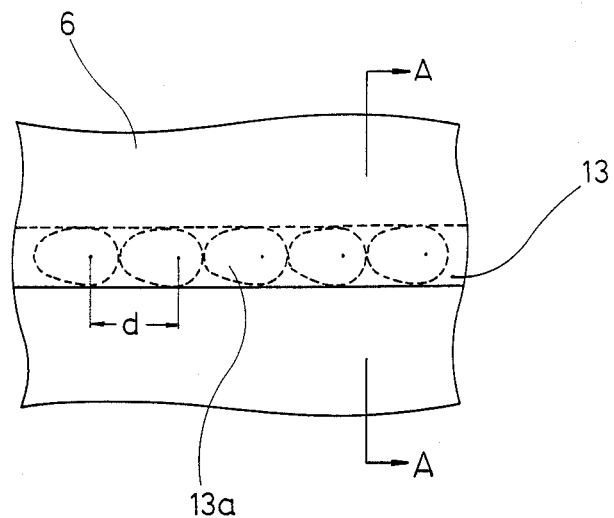
FIG. 4a is a plan view showing a weld zone obtained by the method according to the invention.
Figure 4B:
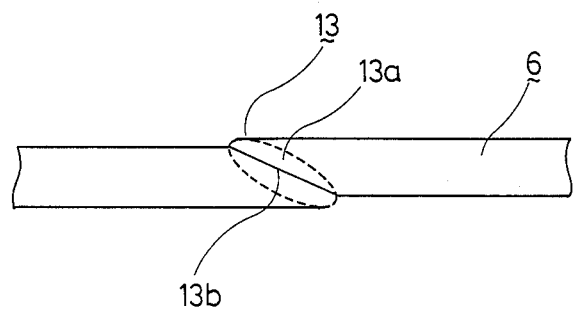

As has been shown, by the method according to the invention the lap joint 12 of the eventual can blank 6 is welded by application of heat and pressure between the upper and lower wire electrodes 5. The thickness (t) of the eventual can blank 6 may be 0.5 mm or less. The width (W) of the contct surface of the upper and lower wire electrodes 5 is set to be more than three times the width (G) of the lap joint 12 of the eventual cank blank 6. The width (G) of the lap joint 12 is set to be less than three times the thickness (t) of the blank. Under the conditions noted above, the welding is effected such that continuous thermal press bond sections 13a are formed in the weld zone 13, as shown in FIG. 4, and also that the center-to-center distance (d) between adjacent thermal press bond sections 13a is 0.8±0.2 mm, as shown in FIG. 4(a).

In the usual mesh seam welding, it is necessary that welding surfaces are more or less fused and then solidified to form nuggets. In the method according to the invention, however, no such nuggets are formed, so that inclined welding surfaces must be satisfactorily joined by thermal press bonding. In addition, adjacent thermal press bond sections have to be formed continuously, whereas their center-to-center distance (d) has to be in a specific range. If the distance (d) is in excess of the required range, bondless zones would result. With such a can, the content would leak through the bondless zones. Thus, it is not suited as a food can or a drink can. Further, in order to obtain a satisfactory thermal press bond sections, it is necessary to make the width (G) of the lap joint 12 as small as possible with respect to the width (W) of the contact surfaces of the upper and lower wire electrodes 5 to ensure heat sufficient to uniformly heat the entire welding surface area and a pressure capable of satisfactorily pressing the lap joint.

More specifically, to obtain a food can or a drink can, it is necessary to process the ends of the welded blank for forming flanges, to which the lid and bottom are to be secured. To withstand this process, the weld zone must has nearly the same hardness as the blank material. To form a weld zone having such a mechanical strength, the formation of nuggets based on the fusion of part of the joint is not desirable. Where no nuggets are formed, on the other hand, deterioration of the tensile strength of the weld zone is liable to result. Accordingly, in the method according to the invention it is necessary to control the center-to-center distance of adjacent thermal press bond portions to a proper range. In addition, it is necessary that adjacent thermal press bond portions overlap very slightly or do not overlap at all but just touch each other. In a further aspect, the blank material is very thin, with its thickness being less than 0.5 mm, and this thin blank material is placed with tin or provided with other metal cover layer formed by a chemical process. Further, a resin coating layer is fixed to the surface of the blank material before the processing thereof to form the can. At this time, the character of the surface of both edges of the blank material that form the lap joint is changed. More specifically, a tin plating layer, for instance, is composed of a Sn-Fe alloy and Sn. At the time of fixing the resin coating layer, Sn in the edges is considerably alloyed with Fe and is substantially lost. This loss of Sn is liable to cause fluctuations of the contact resistance during welding process and increase the deformation resistance during press bonding process.

To obtain under such a special condition a weld zone with continuous thermal press bond portions, therefore, it is necessary to provide heat in a range, in which the lap joint surface is not entirely fused. Besides, the quantity of heat to be provided must match the width and thickness of the lap joint that determine the heat capacity thereof. Further, it is necessary to cause sufficient deformation of the contact surface of the lap joint. Furthermore, it is necessary to apply downward and upward pressures sufficient to destroy the skin on the contact surface. Unless the conditions noted above are not satisfied, the weld zone may be separated, or the lap joint is not fused up to the surface, the weld zone is partly fused or nuggets are formed continuously. the formation of continuous nuggets would change the hardness and structure of the weld zone from those of the blank material.

In general, when nuggets are formed such that they may partly overlap one another, they influence one another to promote fusion. This leads to a status similar to that which results when the weld zone is energized with DC. Further, when adjacent thermal press bond section partly overlap, the overlapping portions would often influence each other and be fused, giving rise to similar problems.

The inventors have conducted investigations about proper conditions with respect to the above, and found that the thermal press bond portions have to be obtained without substantial fusing. For this reason, the center-to-center distance (d) between adjacent thermal press bond portions 13a ( see FIG. 4(a) ) is necessary in view of restricting the quantity of heat supplied and cycle period of heat supply. It is further found that the thickness of the blank material and width of the lap joint, are necessary in view of restricting the heat capacity. An investigation also has been conducted in connection with the condition to be satisfied in case when the blank material thickness is 0.5 mm or less and the width of the lap joint is three times the thickness of less. As the proper condition, it is found that where the thickness of the blank material and the width of the lap joint are in the ranges noted above, the proper range of the center-to-center distance between adjacent thermal press bond sections is 0.8±0.2 mm, i.e., 1.0 to 0.6 mm.

If the distance exceeds the upper limit of 1.0 mm, it is necessary for obtaining the bond to produce a fused state to a certain extent by extremely increasing the quantity of heat supplied. If thermal press bonding is done without fusion, there occurs a bondless zone between adjacent thermal press bond sections. If the distance is smaller than the lower limit of 0.6 mm, on the other hand, the speed of welding is reduced, giving rise to problems in connection with the productivity. In addition, overlap of adjacent thermal press bond sections 13a is increased. This overlap portion is fused for it is repeatedly heated. Therefore, a satisfactory thermal press bond cannot be obtained. It may be thought to reduce the area of the series of thermal press bond sections in correspondence to the reduction of the center-to-center distance noted above. However, to reduce the area of the thermal press bond portions leads not only to the detracting of the tensile strength of the weld zone, but also it is impossible to heat the entire welding surface area 13b (see FIG. 4(b)). Even if the width of the lap joint is reduced, it is limited to make it reduced by the present technology. Further, when the contact surface area of the lap joint is small, the welded state is liable to be changed with a change in the contact resistance. Further, where the blank material is a tin-placed steel sheet, the tin on the surface is considerably alloyed during fixing of the surface resin coating so that the tin layer is extremely reduced as noted above. Still further, carbon that is generated during fixing the resin coating is attached to the lap joint. Therefore, the contact resistance flucuates greatly, resulting in local fusion to make it impossible to obtain a sound weld zone.

The width (W) of the contact surfaces of the upper and lower wire electrodes is suitably more than three times, preferably more than 13.1 times, the width (G) of the lap portion.

Generally, reducing the width of the lap joint permits reduction of the diameter of the wire electrode, and hence saving of the blank material and expensive wire electrode. For the formation of satisfactory thermal press bond sections, it is desirable to make the width of the lap joint as small as possible to increase applied pressure while increasing current so that the entire contact surface can be heated uniformly. From this standpoint, the width of the upper and lower wire electrodes is increased to reduce the resistance of contact between the roller electrode and wire electrode. Setting a large width of the wire electrodes compared to the width of the lap joint also has an effect of ensuring a satisfactory contact state of the lap joint irrespective of slight deviation thereof caused due to such cases as vibrations of the welder. Further, even if the contact surface of the lap joint is changed due to alloying of tin or the like at the time of fixing of the surface resin coating, the surface can be destroyed by high applied pressure to obtain satisfactory plastic deformation, so that a satisfactory thermal press bond can be obtained.

If the width (W) of the upper and lower wire electrodes is no greater than three times the width (G) of the lap joint, the deviation noted above presents undesired problems, and also the applied pressure is reduced to give rise to problems in the thermal press bond. Therefore, a sound weld zone cannot be obtained.

The width (G) of the lap joint is determined in relation to the width (W) of the contact surface of the upper and lower wire electrodes as noted above, and it is also determined in relation to the thickness (t) of the blank material, i.e., it is no greater than three times, preferably less than three time, the thickness (t).

The reduction of the width of the lap joint permits saving of the material cost by the saving the blank material and also reduction of the diameter of the wire electrode as noted above. However, a certain lap width is necessary for obtaining a satisfactory thermal press bond. On the other hand, excessively increasing the width of the lap joint increases the heat capacity, so that a satisfactory thermal press bond cannot be obtained. Further, the heat capacity is related not only to the width of the lap joint but also to the thickness of the blank material. To obtain satisfactory thermal press bonding, the width of the lap joint is suitably no greater than three times, preferably less than three times, the thickness of the blank material.

The center-to-center distance between adjacent thermal press bond sections, is given as a function of the frequency of the welding voltage or current and welding speed. From the standpoint of productivity, generally the welding speed is fixed, and the frequency of the welding voltage or current is varied with electric means, e.g., a converter. By doing so, the distance noted above can be readily controlled to be in the necessary range.

The current caused at the time of the welding, determined mainly in relation to the character of the blank material surface, width of the lap joint, ect. Usually, a current of 2,800 of 4,440 A is necessary. The current should be increased with increing lap joint width. Also, where the blank material is a covered steel sheet, the current should be increased with increasing amount of coating metal. For example, a preferred range of current is 4,100 to 4,300 A when the lap joint width is around 0.6 mm, while it is about 3,700 to 3,900 A when the lap joint width is 0.4 mm. It is preferably 3,700 to 4,200 A when the quantity of Sn in placing layer is 5.5 to 6.0 g/mm$^2$, 3,750 to 4,200 A when the Sn quantity is 8.0 to 8.5 g/cm$^2$, 3,800 to 4,250 A when the Sn quantity is 11.0 to 11.50 g/mm$^2$, and 3,780 to 4,300 A when the Sn quantity is 22.0 to 22.50 g/mm$^2$.

The applied pressure is controlled in relation to the welding speed, width of the lap joint, thickness of the blank material, etc. Particularly, for obtaining satisfactory thermal press bonding, it is set to be in a range of 15 to 60 kg/mm$^2$ on the contact surface. When the welding speed has to be increased, the applied pressure also has to be increased. For example, it is preferable in a range of 50 to 60 kg/mm$^2$ when the welding speed is 45 m/sec., and in a range of 15 to 60 kg/cm$^2$ when the welding speed is 7 m/sec.

Example will now be given.

EXAMPLE 1

Figure 5:
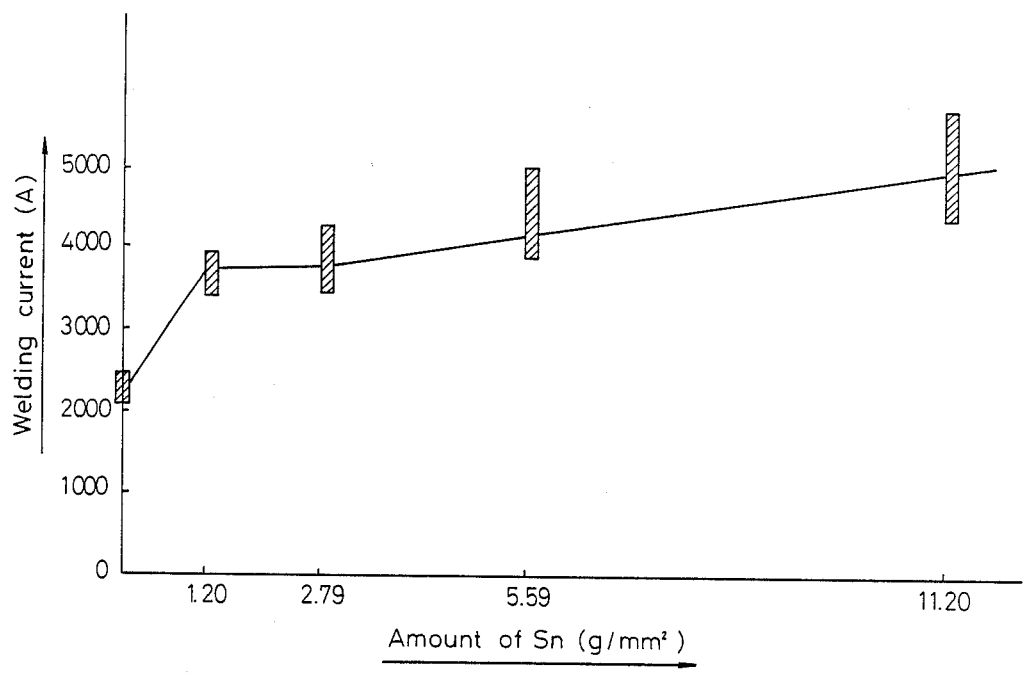
FIG. 5 is a graph showing the relation between the amount of plating Sn and welding current.
Figure 6:
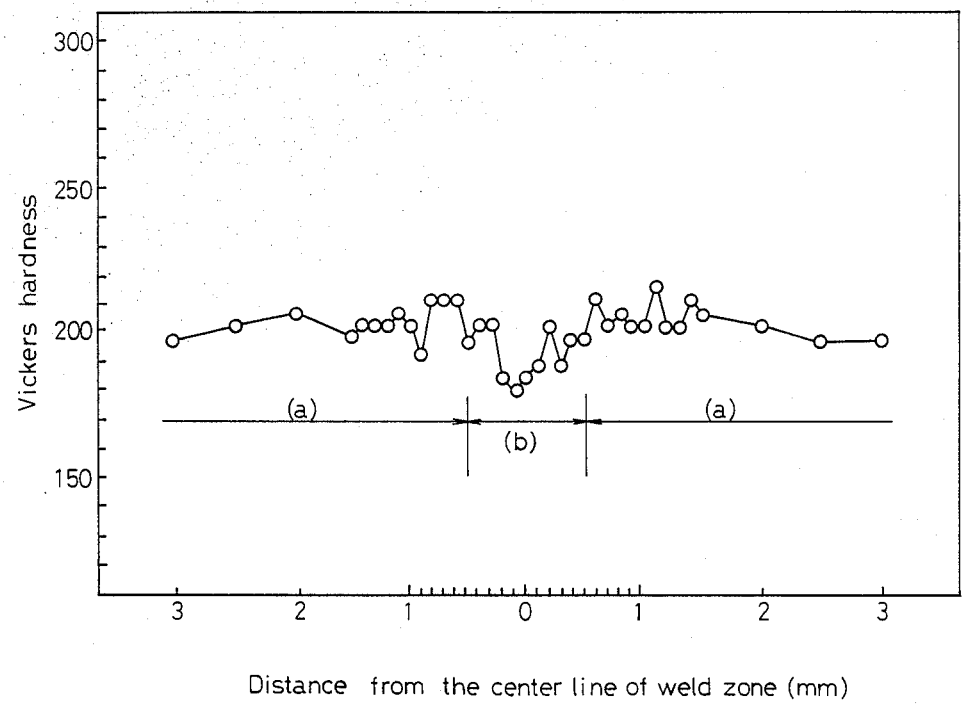
FIG. 6 is a graph showing the hardness of the weld zone and blank material.
Figure 3:
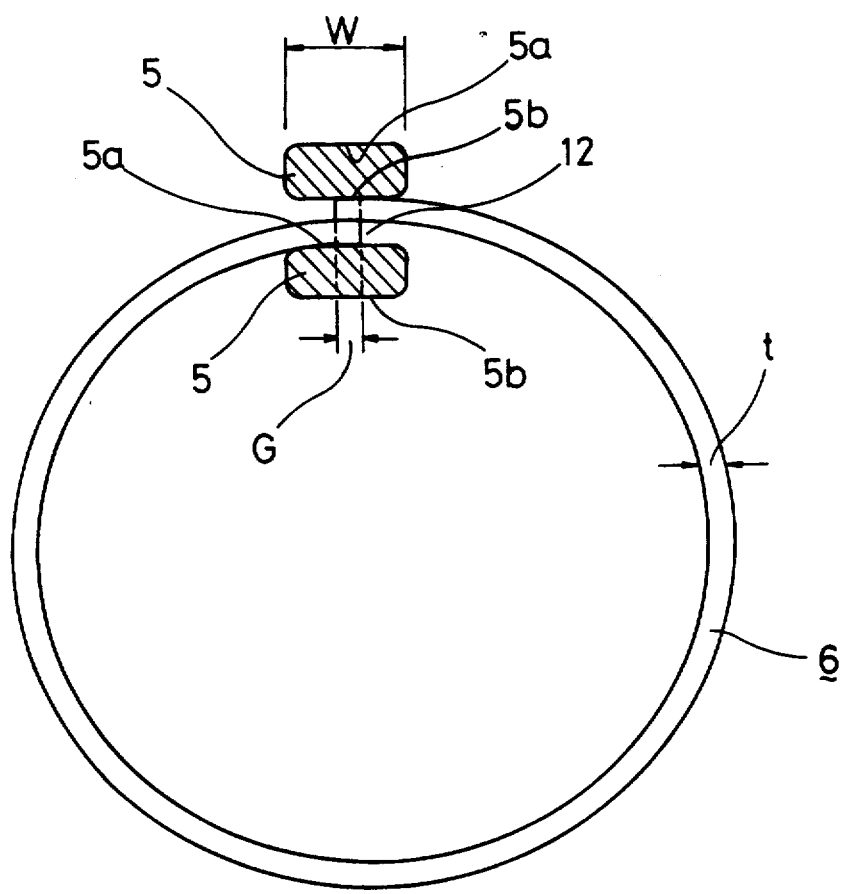

Steel sheets having the chemical composition and mechanical characteristics as shown in Table 1 and a thickness of 0.5 to 0.15 mm were prepared, and plating layers as shown in FIG. 2 were formed by electroplating on the individual steel sheets as shown in Table 2. The blank material thus obtained was formed into a cylindrical shape as eventual can blank. These eventual can blanks were welded under conditions of a blank thickness of 0.20 mm and a lap joint width of 1.8 mm by causing a current of a sine wave and applying a pressure. FIG. 5 shows the relation between welding current range and amount of Sn plated. (shaded portions represent ranges capable of obtaining thermal press bond.) It will be seen that with increase of the amount of Sn the range of welding current that is capable of obtaining thermal press bond is increased to greatly improve the operability. The Vickers hardness of the weld zone obtained and blank material were measured. FIG. 6 shows the results of measurements. In FIG. 6, the values of hardness in portions (a) are of the blank material, and in portion (b) are of the lap joint weld zone. It will be seen that there is no substantial difference in the hardness between the blank material and weld zone.

The Sn-plated steel sheet sample #25 shown in Table 2 was used to make welding under different welding conditions as shown in Table 3, a pressure of 45 to 52 kg/mm² being applied, and the welding speed being set to 41.9 m/min. The center-to-center distance between adjacent thermal press bond sections was varied by varying the frequency.

The results were as shown in Table 3.

TABLE 1

| Chemical composition (wt %) | | | | | |
|---|---|---|---|---|---|
| C | Si | Mn | P | S | Fe |
| 0.06–0.04 | 0.03–0.02 | 0.21–0.25 | 0.010–0.015 | 0.022–0.025 | Bal |

| Mechanical Characteristics | | | |
|---|---|---|---|
| Yield strength (kgf/mm²) | Tensile strength (kgf/mm²) | Elongation (%) | Hardness (Vickers) |
| 38.3 | 42.3 | 30.4 | 190–200 |

TABLE 2

| | Amount of Sn (g/mm²) | Purpose |
|---|---|---|
| #5 | 0.55 | Drink (soft drink) can, confectionary can |
| #10 | 1.19 | Drink can, beer can, confectionary can |
| #25 | 2.79 | Beer can, drink can, fish meat can |
| #50 | 5.59 | Meat can, vegetable can |
| #75 | 8.40 | Powder milk can |
| #100 | 11.20 | Fruit can |

The characters of the weld zone were determined as follows.

(a) The scattering results when fusion occurs and the fused portion partly gets out of the weld zone. In was determined that the scattering was present if a weld zone with scattering could be coated unsatisfactorily.

(b) The air-tightness was determined by filling the welded eventual can blank with 2.1 kgf/cm² of air and checking leakage of air.

(c) To determine the flange processibility, a tapered cylindrical body was inserted into the top opening of the welded eventual can blank, then an upper end portion thereof was folded back, and the separation and cracking of the weld zone were checked for. A weld zone free from neither of these phenomena was determined to be satisfactory.

(d) The determine the bond strength, the sole weld zone was pulled from one end with pincers while holding a different portion of the welded eventual can blank. A weld zone which was broken as a result, was determined to be inferior. A weld zone which could be entirely separated without being broken, was determined to be satisfactory.

(e) The presence or absence of fusion was determined by enlarging a section of the weld zone. If fusion was found even in a portion of the juncture, it is determined that fusion is present, and the extent of fusion was indicated.

Further, can blanks were prepared by coating a resin on the surface of the plated steel sheets shown in Table 2 with the provision of a bond margin of approximately 2 mm and fixing the resin at 205° C. These can blanks were similarly welded. When the applied pressure is increased to 50 and 55 kgf/mm², similar results to those noted above could be obtained. It was also found that Sn on the surface was considerably alloyed.

EXAMPLE 2

The steel sheets shown in Table 1 were Ni-plated as shown in Table 4 in the manner as in Example 1. The can blanks thus obtained were then welded in the manner as in Example 1. The results were as shown in Table 5. In this case, the applied pressure was increased to 50 to 55 kgf/mm², and the current was reduced to approximated 2,800 to 3,200 A.

TABLE 3

| Welding condition | | | Characters of weld zone | | | | |
|---|---|---|---|---|---|---|---|
| Center-to-center distance between adjacent thermal press bond senctions (mm) | G/t | W/G | Scattering | Air-tightness | Frange processbility | Bond strength | Fusion |
| 1.10 | 2.9 | 3.1 | Absent | Inferior | Separated | Inferior | Absent |
| 1.08 | 3.0 | 2.9 | | | | | Slightly present |
| 1.00 | 2.8 | 3.1 | | Satisfactory | Satisfactory | Slightly inferior | Absent |
| 0.95 | 2.0 | 2.3 | | | | Satisfactory | |
| 0.90 | 2.1 | 3.5 | | | | | |
| 0.85 | 2.8 | 4.1 | | | | | |
| 0.80 | 1.5 | 3.9 | | | | | |
| 0.75 | 2.9 | 3.7 | | | | | Very slightly present |
| 0.70 | 2.3 | 3.6 | | | | | Absent |
| 0.65 | 2.1 | 3.5 | | | | | |
| 0.60 | 3.0 | 4.8 | | | | | |
| 0.58 | 2.9 | 2.3 | | Cracked | | | |
| 0.51 | 3.5 | 2.5 | Present | | | | Present |
| 0.46 | 4.1 | 2.8 | Present | | | | |

TABLE 4

| | Amount of Ni (g/m²) | Amount of Cr (g/m²) |
|---|---|---|
| 1 | 0.60 | 5.2 |
| 2 | 0.54 | 9.1 |

TABLE 5

| Welding condition | | | Characters of weld zone | | | | |
|---|---|---|---|---|---|---|---|
| Center-to-center distance between adjacent thermal press bond senctions (mm) | G/t | W/G | Scattering | Air-tightness | Frange processbility | Bond strength | Fusion |
| 1.21 | 2.80 | 3.3 | Present | Inferior | Satisfactory | Inferior | Present |

TABLE 5-continued

| Welding condition | | | Characters of weld zone | | | | |
|---|---|---|---|---|---|---|---|
| Center-to-center distance between adjacent thermal press bond senctions (mm) | G/t | W/G | Scattering | Air-tightness | Frange processibility | Bond strength | Fusion |
| 1.01 | 3.10 | 3.4 | | | Separated | | Absent |
| 1.00 | 3.00 | 3.1 | Absent | Satisfactory | Satisfactory | Satisfactory | |
| 0.90 | 2.11 | 3.2 | | | | | |
| 0.82 | 2.89 | 3.5 | | | | | |
| 0.80 | 1.91 | 4.1 | | | | | |
| 0.71 | 2.51 | 5.0 | | | | | |
| 0.65 | 2.61 | 3.7 | | | | | |
| 0.60 | 2.80 | 6.1 | | | | | Present |
| 0.59 | 2.99 | 2.8 | Present | | Cracked | | |
| 0.51 | 3.10 | 2.9 | | | | | |

Further, when the lap joint 12 of the can blank 6 is urged between the upper and lower roller electrodes 3 and 4 with a single-phase AC current with the polarity thereof changing for a predetermined cycle time as noted above, the welding current at the time of urging the lap joint 12 can be property controlled by connecting the three-phase power source (not shown) to an AC-to-DC converter (not shown), which rectifies the three-phase AC current and converts it into DC current, connecting the converter to an inverter (not shown), which has a variable impedance element for converting the DC current into a single-phase AC current with the polarity thereof changing for every cycle time, connecting the single-phase AC output of the inverter through a capacitor (not shown) to the primary side of a transformer (not shown), connecting the secondary side of the transformer to the upper and lower roller electrodes 3 and 4 and varying the conduction period of the variable impedance element with the inverter.

More specifically, where there are voltage variations on the side of the three-phase AC power source or variations of the pressure between the upper and lower roller electrodes, the primary and secondary side voltages of the transformer are varied so that the welding current cannot be held constant. In this case, the welding current can be held constant through control of the primary of secondary side voltage of the transformer. However, the welding current can be suitably controlled to ensure stable welding through control of the primary side voltage of the transformer by controling the conduction period of the variable impedance element. Further, in the method according to the invention, even when the welding speed is varied for urging the lap joint of the can blank, it is necessary to maintain a constant center-to-center distance between adjacent thermal press sections of the lap joint. In this case, the frequency of the inverter is varied according to the welding speed.

However, when the inverter frequency is increased, the voltage effect is increased due to burden of leakage inductance of the transformer and welding inductance. Therefore, it becomes progressively difficult to obtain current. Since the increase of the inverter frequency has an aim of increasing the welding speed, a reduction of the welding current due to an inverter frequency increase is a great drawback. Even in such a case, according to the invention the burden on the transformer can be cancelled by the capacitance which is present between the output side of the inverter and the primary side of the transformer. It is thus possible to have a smooth welding current without increasing the inverter voltage.

Further, when the DC is converted into the single-phase AC with the polarity thereof changing for every predetermined period of time in the inverter through on-off control of the variable impedance element, a DC component is contained in the single-phase AC output of the inverter at the time of the on-off operations due to fluctuations of the ready time. This DC component is liable to cause partial magnetization of the transformer, leading to an overcurrent in the inverter to adversely affect the operation thereof. According to the invention, the DC component can be absorbed by the capacitor present between the inverter and transformer, so that only the single-phase AC is applied to the transformer and no overcurrent will flow through the inverter. Smooth operation of the inverter thus can be ensured.

Further, the inverter frequency can be varied through control of the conduction period of the variable impedance element, i.e., through on-off control of the switch element.

Further, when welding the lap joint of the can blank with the single-phase AC current caused between the upper and lower roller electrodes, it takes a long time until the edges of the can blank are brought into contact between the upper and lower roller electrodes, thus leading to the seizure or melting. Accordingly, when the can blank edges are brought into contact with the upper and lower roller electrodes and also when they are separated from the electrodes, the current may be reduced, while the contact is attained, the current may be increase to a proper value. To this end, detecting means for detecting the instant when the can blank edges are brought into contact and the instant when they are separated may be provided, so that the current may be switched between the low and high value noted above according to a signal from the detecting means.

What is claimed is:

1. A method of lap welding a blank of metal sheet or a covered metal sheet to form a can comprising the steps of;

overlapping both edge portions of the blank to form a lap joint, simultaneously heating and applying a pressure to the lap joint by feeding the lap joint between upper and lower wire electrodes held by upper and lower roller electrodes, respectively, thereby welding the lap joint, said lap joint is electrically heated during applying pressure to said lap joint between upper and lower wire electrodes, each of said upper and lower electrodes has a contact width more than three times that of said lap joint, wherein sequences of thermal press bond sections are formed without the formation of a melting zone, each of which has a Vickers hardness in a range of 170 to 210, the center-to-center distance between adjacent thermal press bond sections being set to be in a range of 0.8±0.2 mm.

2. The method of claim 1, wherein the width of said lap joint is less than three times the thickness of said blank.

3. The method of claim 1, further comprising the step of adjusting the pressure applied between said upper and lower roller electrodes as a function of the thickness of said blank.

4. The method of claim 3, wherein said pressure is in the range of 15 to 60 kg/mm$^2$.

* * * * *

REEXAMINATION CERTIFICATE (1450th)
United States Patent [19]
Ban

[11] B1 4,732,026
[45] Certificate Issued Apr. 16, 1991

[54] METHOD OF LAP WELDING EVENTUAL CAN BLANK CONSISTING OF METAL SHEET OR THE LIKE

[75] Inventor: Kunikatsu Ban, Mie, Japan

[73] Assignee: N.P.W. Technical Laboratories, Mie, Japan

Reexamination Request:
No. 90/001,872, Oct. 30, 1989

Reexamination Certificate for:
Patent No.: 4,732,026
Issued: Mar. 22, 1988
Appl. No.: 838,502
Filed: Mar. 11, 1986

[30] Foreign Application Priority Data

Mar. 11, 1985 [JP] Japan .................. 60-48699

[51] Int. Cl.$^5$ .............. B21D 39/02; B21D 51/28; B23K 11/06
[52] U.S. Cl. ........................... 72/52; 219/64; 219/83; 219/84; 228/150
[58] Field of Search ..................... 219/78.02

[56] References Cited

U.S. PATENT DOCUMENTS

| | | | |
|---|---|---|---|
| 3,596,043 | 7/1971 | Sporri | 219/83 |
| 3,644,698 | 2/1972 | Metcalfe et al. | 219/78.02 |
| 3,834,010 | 9/1974 | Wolfe et al. | 228/150 |
| 3,851,138 | 11/1974 | Metcalfe et al. | 219/78.02 |
| 4,160,892 | 7/1979 | Opprecht et al. | 219/83 |
| 4,258,245 | 3/1981 | Flaherty | 219/83 |
| 4,352,001 | 9/1982 | Ishibashi et al. | 219/64 |
| 4,404,447 | 9/1983 | Kitamura et al. | 219/83 |
| 4,595,326 | 6/1986 | Matsuno et al. | 219/64 X |

FOREIGN PATENT DOCUMENTS

2150016 4/1973 Fed. Rep. of Germany ...... 228/265

OTHER PUBLICATIONS

Exhibit A: Soudronic AG, Hochleistungs–Schweissbodymaker ABM–Superwima–Reihe, Oct. 1978.
Exhibit B: Dr. Alfred Huthig Verlag, WIMA–Welding for Aerosol Cans, Aug., 1976.
Exhibit C: Von P. Opprecht, Rollennahtschweissen beschichteter Stahlbleche mittels Drahtelektroden, Oct. 1976.
Exhibit D: Soudronic AG, SUPER–WIMA–Welding for cans, Sep. 1977, pp. 1–2.

*Primary Examiner*—R. L. Spruill

[57] ABSTRACT

A method of lap welding an eventual can blank of a metal sheet or the like by passing a lap joint between the upper and lower roller electrodes via upper and lower wire electrodes to be heated and simultaneously applied pressure, thereby forming continuous thermal press bond sections, wherein the width of the contact surface of the upper and lower wire electrodes is set to three times the width of the lap joint, and the thermal press bond sections are formed by thermal press bonding without fusion, the center-to-center distance between adjacent thermal press bond sections being set to be in a range of $0.8 \pm 0.2$ mm.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–4 are cancelled.

New claims 6 and 8 (renumbered 6 and 5) are added and determined to be patentable.

*5. A method of lap welding a blank of metal sheet or a covered metal sheet to form a can, comprising the steps of: overlapping both edge portions of the blank to form a lap joint having a width being less than three times the thickness of said blank, simultaneously heating and applying a pressure to the lap joint in an air atmosphere by feeding the lap joint between upper and lower wire electrodes held by upper and lower roller electrodes, respectively, thereby welding the lap joint, said lap joint being electrically heated during application of pressure to said lap joint between upper and lower wire electrodes, each of said upper and lower electrodes having a contact width more than three times width of said lap joint, wherein sequences of thermal press bond sections are formed without the formation of a melting zone in said air atmosphere, each of said thermal press bond sections having a vicker's hardness ranging from 170 to 210, and the center-to-center distance between adjacent thermal press bond sections being set to be in a range of $0.8 \pm 0.2$ mm.*

*6. The method of claim 5, wherein said blank has a vickers hardness ranging from 190 to 200.*

* * * * *